Patented Dec. 13, 1932  1,890,578

UNITED STATES PATENT OFFICE

CECIL HAYES, OF SUTTON COLDFIELD, AND EVELYN WILLIAM MADGE AND FREDERICK CHARLES JENNINGS, OF ERDINGTON, ENGLAND, ASSIGNORS TO DUNLOP RUBBER COMPANY LIMITED, A BRITISH COMPANY

MANUFACTURE OF GOODS OF RUBBER OR SIMILAR MATERIAL

No Drawing. Application filed February 8, 1930, Serial No. 427,051, and in Great Britain February 19, 1929.

This invention comprises improvements in or relating to the manufacture of goods of rubber or similar material by any one or more operations such as spreading, dipping, impregnating, spraying, moulding or extruding from aqueous emulsions or dispersions of rubber or similar material of the kinds hereinafter specified rendered capable of gelling in the cold or by the application of heat or friction in definite controllable time intervals.

The term "gelling" is meant to signify the change of state of the rubber or the like material in the aqueous dispersion from the dispersed state to the state wherein the rubber forms the continuous phase. The whole of the dispersion medium is included in the pores, capillaries or cells of microscopic or ultra-microscopic dimensions of the structure of the solid produced. The gel so formed is a strong homogeneous irreversible solid structure without pores visible to the naked eye. The microscopic or ultra-microscopic pores, capillaries or cells which contain the serum gradually become smaller or completely disappear on drying of the gel.

According to the invention it has been found that the addition to the emulsions or dispersions of certain quantities of one or more phenolic substances such as phenol with or without the addition of a substance having tanning properties such as tannic acid leads upon the subsequent addition of or contacting with a substance capable of reducing the alkalinity of the emulsion or dispersion, but which is to be free from any local coagulative action, to the formation of a gel in the cold or by the application of heat or friction in definite and controllable time intervals.

During the process of gelling the original aqueous dispersion passes through a creamy and paste-like condition and gradually and uniformly sets to a coherent irreversible mass of uniform structure with definite elastic properties. It has been found that if an aqueous solution of phenol is added to natural or concentrated latex of a high or low alkalinity and if sufficient formaldehyde is added to neutralize the ammonia the latex is still very mobile and may be poured into a mould of any desired shape. In the space of a few minutes, however, the mixing thickens rapidly and finally sets to a firm gel. The time of gelling is controllable between wide limits, as for example, three minutes or less to one hour or more according to the amounts of the reagents used.

It is known that natural latex preserved with ammonia is quite stable in the presence of small quantities of phenol and it is now found that the gelling action does not take place until the ammonia content or a large proportion of it is neutralized by the addition of or contacting with formaldehyde or a similar substance.

The amount of phenol added to latex can be varied within certain limits. If less than a certain critical amount of phenol is added the latex thickens to a paste after the addition of the formaldehyde, but it does not gel; if an upper limit of phenol is exceeded, the latex thickens considerably and gels during stirring so that it is not possible to add the neutralizing solution such as formaldehyde uniformly. It has been found that with latex concentrated to about 60% by a centrifuging process and of an alkalinity of about 0.5% and to which no compounding ingredients have been added the amount of phenol to be added for satisfactory gelling lies between 5 and 6.5 parts to 100 of rubber. Should such a centrifuged latex concentrate be compounded, the compounding ingredients being incorporated in the usual manner with a small amount of protective colloid, the quantity of phenol necessary is found to be very much less than that required for the uncompounded centrifuged concentrate. The same diminution in phenol required has been observed in compounded normal latices as long as no additional stability has been induced by the addition of excessive amount of protective colloids.

The time for attaining the gelled condition is increased by diminishing the amount of phenol added though keeping within the limits given above and by diminishing also the amount of formaldehyde added. It has also been found that ⅓ of the phenol may be replaced by an equal weight of tannic acid to give the same gel structure of the rubber. The addition of tannic acid alone in place of phenol gives a non-coherent paste and not a coherent gel when the requisite amount of formaldehyde is added to the latex. It has been found that this paste and also the paste produced by adding too small a quantity of phenol is extremely sensitive to heat and friction; slight stirring is sufficient to produce a strong coagulum from the latter paste.

The emulsions or dispersions comprise by way of example, those consisting of or containing rubber, gutta-percha, balata or similar vegetable resins occurring naturally or artificially obtained and in vulcanized or unvulcanized condition. Aqueous dispersions or coagulated rubber, vulcanized rubber, synthetic rubber, waste or reclaim may also be employed if desired as alternatives or admixtures. Any of the aforesaid dispersions may contain the usual known compounding ingredients and/or may be in concentrated form. Concentrates such as are obtained in U. S. application No. 232,705, filed November 11th, 1927, and U. S. application No. 727,530, filed 22nd July, 1924, to which may be added any one or more of the usual compounding ingredients, may also be used.

Examples of latex mixings are as follows:

Example 1

A normal latex having a rubber content of 35% and an alkalinity value of 0.7% is compounded to give the following composition:—

| | Parts by weight |
|---|---|
| Rubber | 100 |
| Sulphur | 3 |
| Accelerator | 0.5 |
| Zinc oxide | 1 |
| Phenol | 1.5 |

The alkali content of the mixing is reduced by formaldehyde to neutrality and it has been found that the gelling of the neutral mixing occurs in the cold within five minutes.

Example 2

Latex concentrated to 60% rubber content by a centrifuging process preserved with approximately 0.4% ammonia is compounded to give the following composition:—

| | Parts by weight |
|---|---|
| Rubber | 100 |
| Sulphur | 3 |
| Accelerator | 0.5 |
| Zinc oxide | 1 |
| Phenol | 1 |

The alkali value of the mixing is reduced by formaldehyde to neutrality and it has been found that the gelling of the neutral mixing occurs within five minutes.

Example 3

Latex concentrated to 60% rubber content by a centrifuging process and having an alkalinity value of 0.4% is compounded to give the following composition:—

| | Parts by weight |
|---|---|
| Rubber | 100 |
| Sulphur | 3 |
| Accelerator | 0.5 |
| Zinc oxide | 1 |
| Phenol | 0.65 |
| Tannic acid | 0.35 |

The alkalinity value of the mixing is reduced by the addition of formaldehyde to neutrality and it has been found that the gelling of the neutral mixing occurs within five minutes.

Various modifications may be made without departing from the invention as defined in the following claims.

What we claim is:

1. A method of gelling rubber latex which comprises treating the latex with phenol and then adding sufficient formaldehyde to reduce the alkalinity of the latex without coagulating it.

2. A method of gelling rubber latex which comprises treating the latex with phenol equal to from about 1% to about 6½% of the content of rubber in said latex, and then adding sufficient formaldehyde to reduce the alkalinity of the latex without coagulating it.

3. A method of gelling rubber latex which comprises treating the latex with a phenol compound and then adding sufficient formaldehyde to reduce the alkalinity of the latex without coagulating it.

4. A method of gelling rubber latex which comprises treating the latex with a phenolic substance and then adding sufficient formaldehyde to reduce the alkalinity of the latex without coagulating it.

5. A method of gelling organic dispersions of rubber material which comprises adding a mixture of phenol and tannic acid to the dispersion, and adding sufficient formaldehyde to reduce the alkalinity of the latex and cause said latex to gel.

6. A method of gelling organic dispersions of rubber material which comprises adding a phenolic substance and a tannic acid to said dispersions, said phenolic substance equalling two-thirds or more of said tannic acid phenolic mixture, and said mixture constituting about 1% or more of the rubber content of said dispersions, and adding sufficient formaldehyde to reduce the alkalinity of the latex without coagulating it and to cause said latex to gel.

In witness whereof, we have hereunto signed our names.

CECIL HAYES.
EVELYN WILLIAM MADGE.
FREDERICK CHARLES JENNINGS.